April 24, 1945.  O. N. NASSET  2,374,298

BOOM ANGLE AND RADIUS INDICATOR

Filed Feb. 25, 1943  3 Sheets-Sheet 1

Olaf N. Nasset
INVENTOR.

BY Victor J. Evans & Co.
ATTORNEYS

April 24, 1945.　　　O. N. NASSET　　　2,374,298

BOOM ANGLE AND RADIUS INDICATOR

Filed Feb. 25, 1943　　　3 Sheets-Sheet 2

Olaf N. Nasset INVENTOR.

BY
Victor J. Evans & Co.
ATTORNEYS

April 24, 1945.  O. N. NASSET  2,374,298
BOOM ANGLE AND RADIUS INDICATOR
Filed Feb. 25, 1943  3 Sheets-Sheet 3

Olaf N. Nasset INVENTOR.

BY
Victor J. Evans & Co.
ATTORNEYS

Patented Apr. 24, 1945

2,374,298

UNITED STATES PATENT OFFICE 2,374,298

BOOM ANGLE AND RADIUS INDICATOR

Olaf Niel Nasset, Toledo, Ohio

Application February 25, 1943, Serial No. 477,119

2 Claims. (Cl. 116—124)

My invention relates to cranes, derricks and the like, and has among its objects and advantages the provision of an improved boom position indicator.

An object of my invention is to provide a device of the type described wherein novel means are provided for accurately indicating the angle and the distance the center of loading is from the center of rotation of the boom in all positions thereof, so that the loading distance of the boom may be readily determined by a glance at the indicator, in addition to the boom angle, whereby loads carried by the boom may be placed in exact predetermined positions and in which the indicator constitutes an aid which enables the operator to determine the proper boom load in the different positions of the boom.

Figures 6, 7:
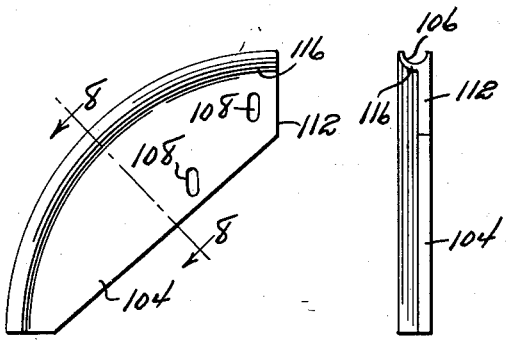
Figures 8, 9:
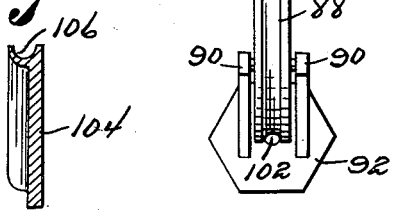

Figures 6 and 7 respectively illustrate a cable guide;

Figure 8 is a sectional view along the line 8—8 of Figure 6; and

Figure 10:
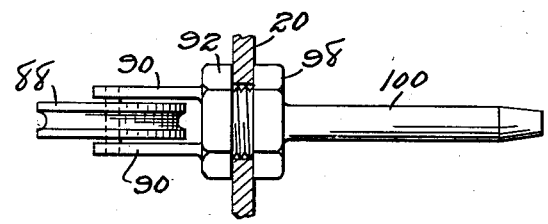
Figure 11:
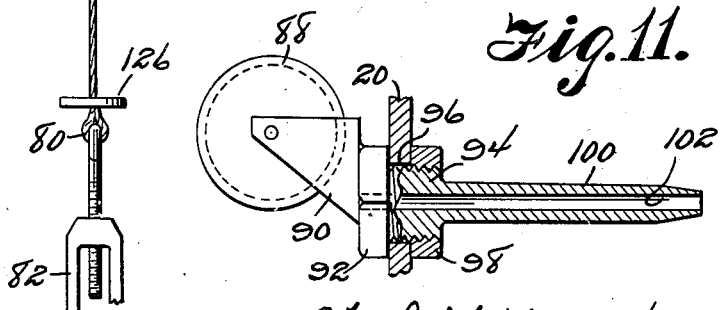

Figures 9, 10 and 11 respectively comprising an end view, a top view and a side view in section of a second cable guide coacting with the structure of Figures 6, 7 and 8.

Figure 1:
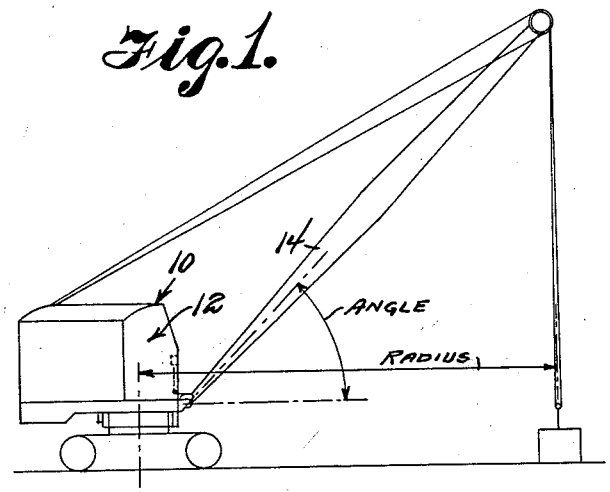
Figure 1 is a diagrammatic elevational view of a conventional crane.
Figure 2:
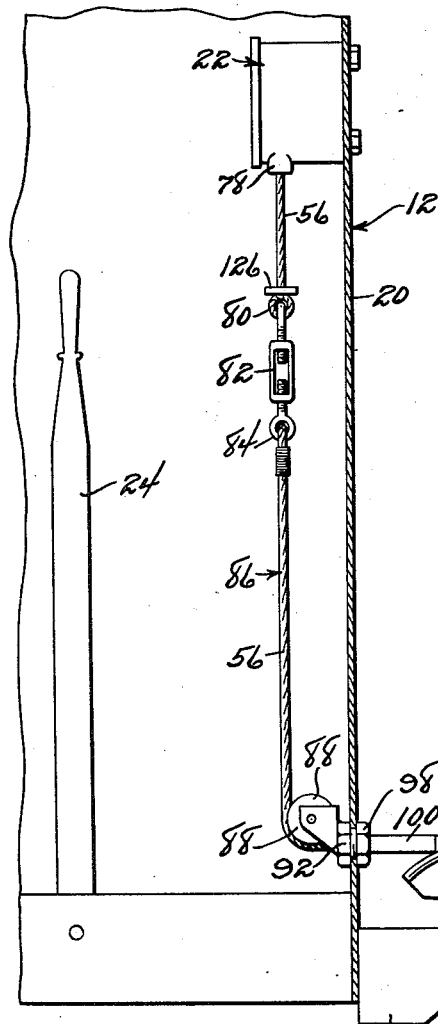
Figure 2 is an enlarged detail view of a portion of the crane boom and cabin illustrating my invention applied thereto.
Figure 2:
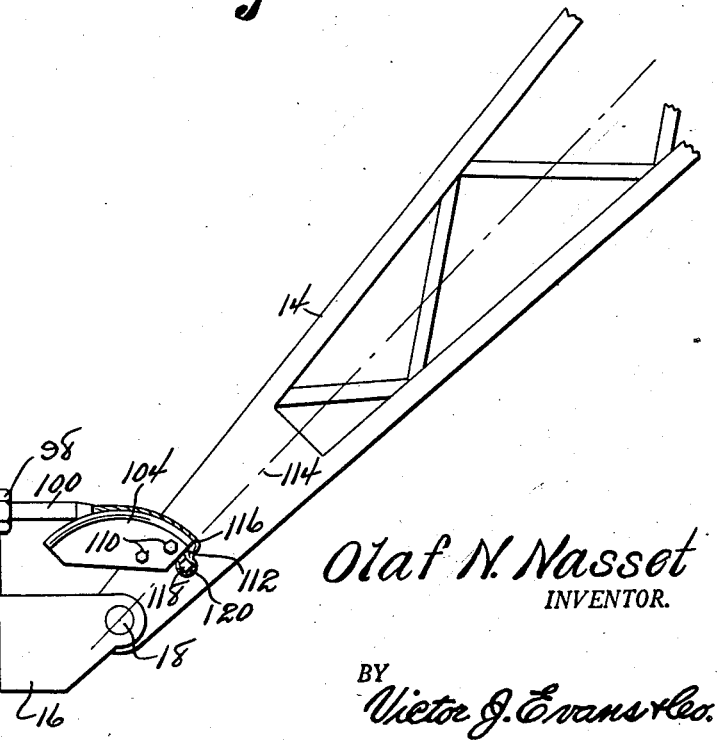
Figure 3:
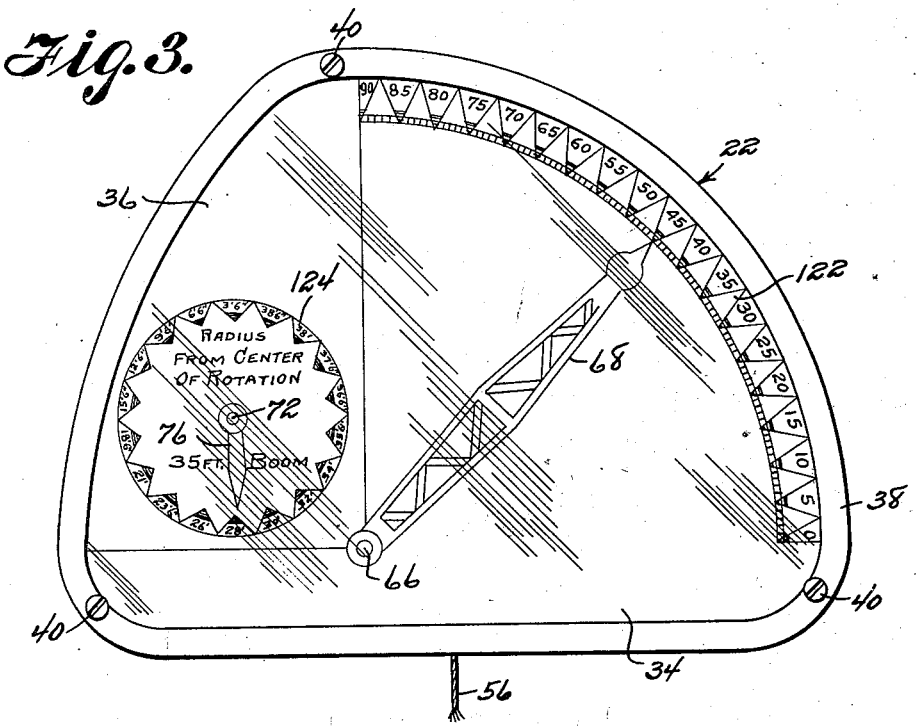
Figure 3 is a face view of the indicator dial housing.

In the embodiment selected for illustration, the crane 10 of Figure 1 includes the usual cabin 12 and boom 14. In Figure 2, the boom 14 is pivotally supported at its lower end on a bracket 16 through the medium of the usual foot pin 18, the bracket 16 being fixedly secured to the cabin 12 in the customary manner.

Figure 4:
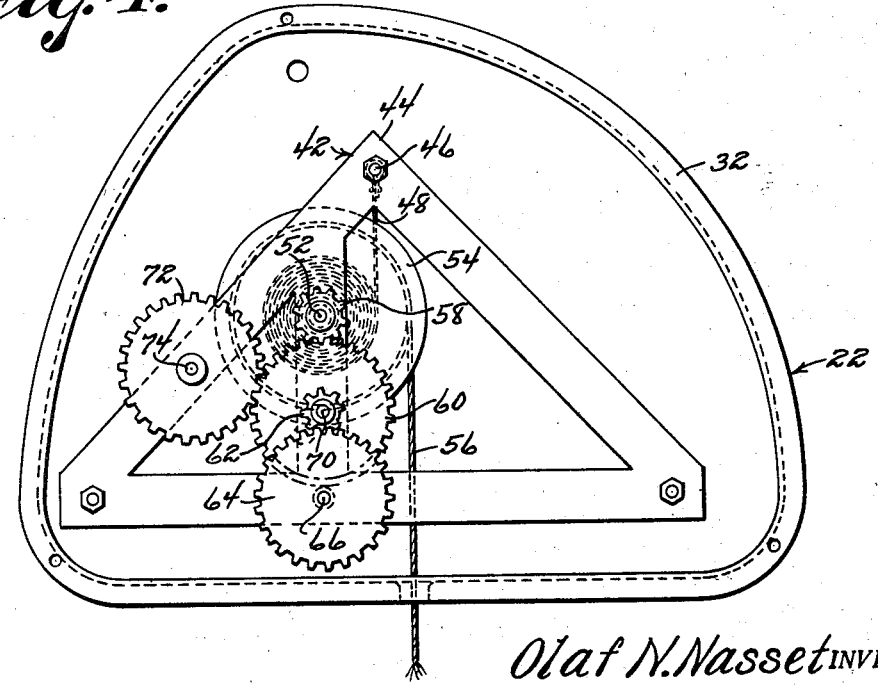
Figure 4 is a similar view with the dials removed.
Figure 5:
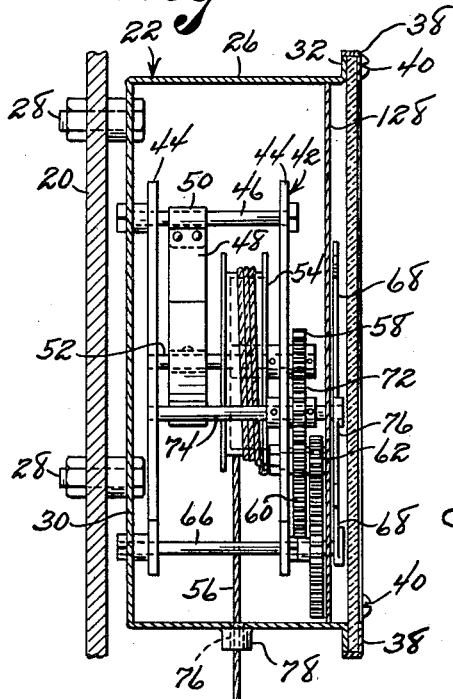
Figure 5 is a transverse sectional view of the dial housing.

To the wall 20 of the cabin 12 is attached a dial housing 22 placed so as to be in view of the crane operator stationed at the control lever 24. Figures 4 and 5 illustrate the dial housing 22 as comprising a cup-like member 26 fixedly secured to the wall 20 through the medium of bolts 28 extending through the bottom 30 of the cup 26. This cup is provided with a flange 32 against which is positioned two transparent dial faces 34 and 36 held in place by a bezel 38 secured to the flange 32 by screws 40.

Inside the cup 26 is mounted a frame 42 including two spaced frame members 44 supporting a pin 46 to which one end of a clock spring 48 is dead-ended, as at 50. This spring is wound on a shaft 52 and fixedly secured thereto, which shaft is rotatably journaled in the frame members 44. On the shaft 52 is fixedly secured a drum 54 to which one end of a small cable 56 is attached. This shaft is also provided with a small pinion 58 meshing with a larger gear 60 provided with a pinion 62 meshing with a gear 64 attached to a shaft 66 rotatably journaled in the frame members 44. To the shaft 66 is fixedly connected a boom angle indicating pointer 68.

The gear 60 and the pinion 62 are fixedly related and rotate on a stub shaft 70 attached to one of the frame members 44. Meshing with the gear 60 is a gear 72 mounted on a shaft 74 rotatably journaled in the frame members 44 and to which a boom loading center indicating pointer 76 is attached.

I prefer to design the drum 54 with a circumference of four inches and rotating through three complete revolutions in ninety degrees of boom travel. The pinion 58 and the gear 60 have a ratio of three to one. The ratio of the pinion 62 and the gear 64 is four to one. The gears 60 and 72 are of equal diameters.

The cable 56 passes loosely through an opening 76 in the cup 26, this cup being provided with a boss 78 through which the opening extends. An eye 80 is formed on the outer end of the cable 56 for connection with a turn buckle 82 connected with an eye 84 in the section 86 of the cable 56. This cable passes around a grooved wheel 88 rotatably supported in a bracket 90 formed on a nut 92. This nut is threadedly connected with a short pin 94 extending through an opening 96 in the wall 20. A second nut 98 is threadedly connected with the pin 94 and coacts with the nut 92 to fixedly secure the pin. This pin is provided with a coaxial extension 100, the pin and the extension being provided with a common cable guiding bore 102.

To the boom 14 is attached a cable guide 104 having a cable guiding groove 106 concentrically curved about the axis of the foot pin 18. This guide is preferably mounted on the boom so as to locate the groove 106 at a radius of seven and five-eighths inches with respect to the axis of the foot pin 18. This guide may be accurately positioned by reason of slots 108 through which are passed fastening bolts 110 threaded into the boom 14.

Figure 2 illustrates the guide 104 as having an end face 112 terminating on the center line 114 of the boom, with the cable bent about the corner 116 and provided with an eye 118 for the reception of a fastening bolt 120 threaded into the boom 14. The guide 104 has a curvature extending throughout an arc of ninety degrees, and the pin 94 and its extension 100 are so positioned that the cable 56 will pull straight from the extension in the different positions of the guide 104.

Coacting with the pointer 68 is a scale 122 for indicating the angular position of the boom. A scale 124 is provided for the pointer 76 to indicate the loading center of the boom with respect to its pivotal axis. The plate 36 is separate from the plate 34 so that the former may be changed to facilitate substitution of plates having scales for booms of various lengths, the scale 124 in the instant case being designed for a boom having a loading center of thirty-five feet.

In operation, the drum 54 has three and one-half wraps of cable 56 thereon when the angle indicating pointer 68 is at the ninety degree graduation on the scale 122. The cable 56 is provided with a stop 126 engaging the boss 78 in the ninety degree position of the pointer 68. As the pointer 68 moves from the horizontal to its vertical positions, the spring 48 rotates the drum 54 to wind the cable thereon. The position of the pointer 68 corresponds at all times to the position of the boom 14.

A plate 128 is mounted in the cup 26 to mask the mechanism of the indicator from view.

Without further elaboration, the foregoing will so fully illustrate my invention, that others may, by applying current knowledge, readily adapt the same for use under various conditions of service.

I claim:

1. The combination with a support and a vertically movable boom pivotally connected with the support, of a dial housing mounted on the support, a first shaft journaled horizontally in the housing, a drum fixed on said shaft, a pinion fixed on the shaft adjacent the drum, a second shaft rotatably mounted parallel with said first shaft, a gear fixed on said second shaft in mesh with said pinion, a pinion fixed on said second shaft, a third shaft rotatably mounted below and parallel with the second shaft, a gear secured on said third shaft meshing with the pinion on the second shaft, a pointer fixed on the third shaft to indicate the angular position of the boom, a fourth shaft journaled on the housing parallel with the first shaft, a gear fixed on said fourth shaft in mesh with the gear on the second shaft, a pointer fixed on said fourth shaft to indicate the distance of the center of the loading from the center of rotation of the boom, a quadrant scale on the housing in co-operative relation with the angle indicating pointer, a circular scale on the housing in co-operative relation with the loading distance indicating pointer, a cable having winding connection with the drum and operatively connected with a boom, and a spring acting on said drum to resiliently wind the cable thereon and tending to turn the pointers to their zero positions.

2. The apparatus as claimed in claim 1 wherein a member is fixedly connected to the boom having an arcuate guide surface on the top thereof, means connecting the outer end of the cable to the boom at the inner end of said guide surface, and a wheel mounted on the support over which the cable is trained, said wheel being disposed to drive the cable so that it extends downwardly from the drum and horizontally to and is pulled over the guide surface as the boom is lowered.

OLAF N. NASSET.